(12) United States Patent
Yim et al.

(10) Patent No.: US 9,608,545 B1
(45) Date of Patent: Mar. 28, 2017

(54) SWITCHING INTERFERENCE SUPPRESSION IN MOTOR DRIVING CIRCUITS USING SPACE VECTOR PULSE WIDTH MODULATION (PWM)

(71) Applicant: Faraday & Future Inc., Gardena, CA (US)

(72) Inventors: Jung Sik Yim, Torrance, CA (US); Silva Hiti, Redondo Beach, CA (US); Steven E. Schulz, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/058,635

(22) Filed: Mar. 2, 2016

(51) Int. Cl.
*H02M 7/5387* (2007.01)
*H02P 27/04* (2016.01)

(52) U.S. Cl.
CPC .................................. *H02M 7/5387* (2013.01)

(58) Field of Classification Search
CPC ............ H02M 7/42; H02M 7/44; H02M 7/48; H02M 7/53; H02M 7/537; H02M 7/5387; H02M 7/53871; H02M 7/5388; H02M 7/53873; H02M 7/53875; H02M 7/539; H02M 7/5395; H02M 2007/53878; H02M 2007/53876; H02M 1/08; H02M 1/32; H02M 1/44
USPC ...... 363/15–21.01, 37, 40–43, 50, 55–56.02, 363/57, 58, 95–99, 131–136; 323/271–276, 282–289, 351; 318/400.17, 318/400.26–400.29, 400.3, 800–803, 811; 375/237–239; 332/109
See application file for complete search history.

(56) References Cited

U.S. PATENT DOCUMENTS

| | | | | |
|---|---|---|---|---|
| 2009/0179608 | A1* | 7/2009 | Welchko | ........... H02M 7/53875 318/801 |
| 2016/0036433 | A1* | 2/2016 | Toshiyuki | ............. H02M 7/538 327/109 |

* cited by examiner

*Primary Examiner* — Timothy J Dole
*Assistant Examiner* — Carlos Rivera-Perez
(74) *Attorney, Agent, or Firm* — Finnegan, Henderson, Farabow, Garrett & Dunner, LLP (57) ABSTRACT

Circuits and methods for driving a load are disclosed. An exemplary driving circuit may include a plurality of switching devices and a controller electrically connected to the plurality of switching devices. The controller may be configured to provide a switching signal for controlling switching operations of the switching devices. The controller may also be configured to determine whether the switching signal falls within a predetermined dead zone. When it is determined that the switching signal falls within the predetermined dead zone, the controller may be configured to modify the switching signal by moving a space vector corresponding to the switching signal to a boundary of the predetermined dead zone. In addition, the controller may be configured to provide the modified switching signal to the switching devices.

17 Claims, 12 Drawing Sheets

SWITCHING INTERFERENCE SUPPRESSION IN MOTOR DRIVING CIRCUITS USING SPACE VECTOR PULSE WIDTH MODULATION (PWM)

TECHNICAL FIELD

The present disclosure relates generally to driving circuit control and, more specifically, to space vector pulse width modulation (PWM)-based driving circuit control for suppressing switching interference.

BACKGROUND

Electric and hybrid vehicle propulsion systems typically employ an alternating current (AC) driving circuit, such as an inverter, to convert direct current (DC) voltage of an energy storage device to variable speed AC waveforms to drive an electric motor. The driving circuit usually includes power electronic devices such as insulated gate bipolar transistors (IGBTs) or metal-oxide-semiconductor field-effect transistors (MOSFETs) as switches to construct AC voltages for driving the electric motor by chopping the DC voltage according to a pulse width modulation (PWM) scheme.

The switches in a driving circuit may be turned on/off at appropriate times according to switching signals supplied by a driver integrated circuit (IC). Some driver ICs may be sensitive to electromagnetic noises caused by switching operations, which may interfere with the switching signals supplied by such driver ICs. Signal interference may cause false turning on/off of the switches, which may, in some cases, cause shoot-through events, i.e., both switches in the upper and lower legs of the same phase are turned on. Severe shoot-through events may damage the switches and should be prevented. Therefore, it is beneficial to suppress the switching interference to prevent unwanted noise events that may affect the performance of the switches.

SUMMARY

In one aspect, the present disclosure is directed to a driving circuit for driving a load. The driving circuit may include a plurality of switching devices and a controller electrically connected to the plurality of switching devices. The controller may be configured to provide a switching signal for controlling switching operations of the switching devices. The controller may also be configured to determine whether the switching signal falls within a predetermined dead zone. When it is determined that the switching signal falls within the predetermined dead zone, the controller may be configured to modify the switching signal by moving a space vector corresponding to the switching signal to a boundary of the predetermined dead zone. In addition, the controller may be configured to provide the modified switching signal to the switching devices.

In another aspect, the present disclosure is directed to a method for driving a load. The method may include providing a switching signal for controlling switching operations of a plurality of switching devices. The method may also include determining whether the switching signal falls within a predetermined dead zone. When it is determined that the switching signal falls within the predetermined dead zone, the method may include modifying the switching signal by moving a space vector corresponding to the switching signal to a boundary of the predetermined dead zone. In addition, the method may include providing the modified switching signal to the switching devices.

In a further aspect, the present disclosure is directed to a driver integrated circuit (IC) for controlling a driving circuit. The driver IC may include a memory storing software instructions for providing a switching signal for controlling switching operations of a plurality of switching devices of the driving circuit. The driver IC may also include a processing device (e.g., a microprocessor) communicatively connected with the memory. The software instructions stored in the memory, when executed by the processing device, may cause the processing device to perform various operations. The operations may include determining whether the switching signal falls within a predetermined dead zone. When it is determined that the switching signal falls within the predetermined dead zone, the operations may include modifying the switching signal by moving a space vector corresponding to the switching signal to a boundary of the predetermined dead zone. In addition, the operations may include providing the modified switching signal to the switching devices. There may also be provided an isolator chip for voltage isolation. In some embodiments, the isolator chip may be combined or integrated with the driver IC.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

The foregoing general description and the following detailed description are exemplary and are not restrictive to the claims.

BRIEF DESCRIPTION OF THE DRAWINGS

Certain embodiments of the present disclosure are illustrated by the accompanying figures. These figures are not necessarily to scale. Details not necessary for understanding the technology or rendering other details difficult to perceive may be omitted. The technology is not necessarily limited to the particular embodiments illustrated herein.

DETAILED DESCRIPTION

Embodiments disclosed in the present application can be in many different forms. Specific embodiments and drawings described herein in detail are exemplary and are not limiting.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. Terms such as "comprises" and "comprising," when used in this specification, specify the presence of stated features, integers, steps, operations, elements, and/or components, but do not preclude the presence or addition of one or more other features, integers, steps, operations, elements, components, and/or groups thereof.

Like or analogous elements and/or components, referred to herein, may be identified throughout the drawings with like reference characters. Figures are merely schematic representations of the present disclosure. As such, some of the components may have been distorted from their actual scale for pictorial clarity.

Embodiments disclosed in the present application involve techniques for suppressing switching interference in motor driving circuits, such as inverters. An inverter may include a plurality of switches that are turned on and off according to switching signals. In operation, a turning on/off operation of one switch may generate electromagnetic noises that may interfere with the switching signal that controls another switch. To suppress the interference, simultaneous or nearly simultaneous switching of two or more switches should be avoided. For example, a preset time interval may be guaranteed between any two consecutive switching signals. The preset time interval may also be referred to as a dead zone in power electronics terminology because no switching events occur during this time interval. If a particular switching scheme requires two switching events to be closer than the preset time interval, or in other words, when one switching event falls within the dead zone of another switching event, then the switching scheme made be modified to guarantee the preset time interval (e.g., to move the switching action out of the dead zone). Such modifications, while reducing the interference, will normally alter voltage signals from their originally designed values, and may cause ripples in phase current. Embodiments of the present application can optimize the switching signal modification process to minimize voltage/current distortion.

Figure 1:
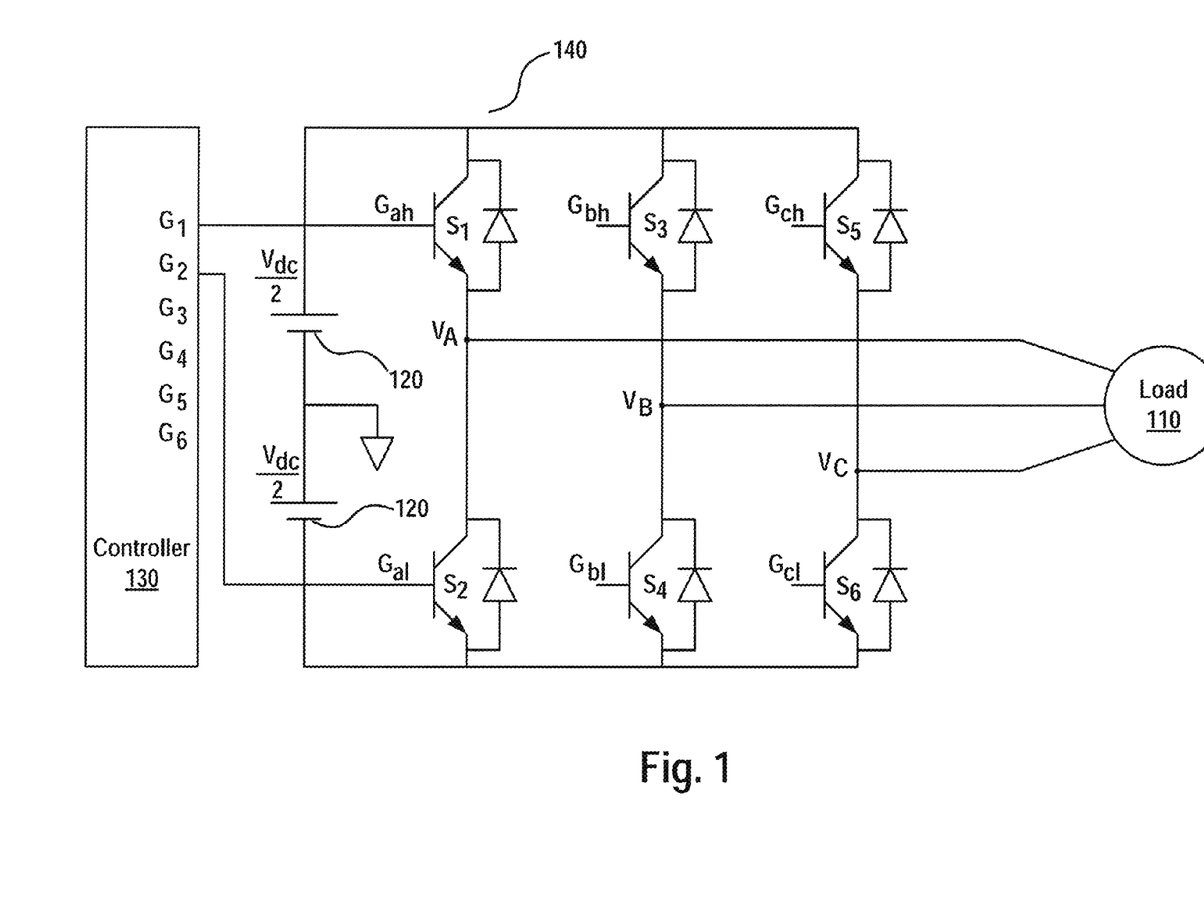
FIG. 1 is a circuit diagram illustrating an exemplary driving circuit, according to some disclosed embodiments.

FIG. 1 shows a circuit diagram illustrating an exemplary driving circuit, according to some disclosed embodiments. The driving circuit may include a three-phase full-bridge inverter 140 and a controller 130. Inverter 140 may convert DC voltage supplied by a DC energy source 120 (e.g., a battery or a group of batteries) into three-phase AC voltages to drive a load 110, such as an electric motor. Inverter 140 may include six switching devices (also referred to as switches) $S_1$-$S_6$ that are arranged in a three-phase full-bridge manner. The switches may be power electronic devices such as insulated gate bipolar transistors (IGBTs) or metal-oxide-semiconductor field-effect transistors (MOSFETs). Each switch may be controlled by a switching signal applied to its gate terminal. The switching signal may be supplied by controller 130, which may include a driver IC. The driver IC may also include a memory for storing data associated with the switching signal, such as a look-up table, a formula, etc. The memory may also store software programs for implementing functions disclosed in this application. The driver IC may also include a processing device (e.g., a microprocessor) communicatively connected with the memory for performing logic operations, computations, data processing, etc. For example, the processing device may execute the software programs stored in the memory to perform functions or operations disclosed in this application.

The driver IC may be equipped with output terminal(s)/pin(s) for supplying the switching signal. As shown in FIG. 1, controller 130 includes a gate command pin $G_1$ that is electrically connected with the gate terminal $G_{ah}$ of switch $S_1$. Similarly, another gate command pin $G_2$ is electrically connected with the gate terminal $G_{al}$ of switch $S_2$. Here, gate terminal $G_{ah}$ indicates that it is the gate terminal of switch $S_1$ that is in phase A, high side (or upper arm). Similarly, gate terminal $G_{al}$ indicates that it is the gate terminal of switch $S_2$ that is in phase A, low side (or lower arm). The gate terminals of switches in phases B and C ($G_{bh}$, $G_{bl}$, $G_{ch}$, $G_{cl}$) can be similarly connected with respective gate command pins ($G_3$-$G_6$) of controller 130. For simplicity, these connections are omitted in FIG. 1.

During switching operations, $S_1$-$S_6$ may be turned on and off to supply phase voltages $V_A$, $V_B$, $V_C$ with positive or negative DC voltage. For example, when $S_1$ is turned on and $S_2$ is turned off, $V_A$ is roughly equal to $V_{dc}/2$ (neglecting the voltage drop on $S_1$). On the other hand, when $S_1$ is turned off and $S_2$ is turned on, $V_A$ is roughly equal to $-V_{dc}/2$. By controlling the turning on/off durations, a series of positive and negative pulses can be generated as phase voltages. These pulses, once low-pass filtered, may approximate sinusoidal waves for driving load 110. Such a DC to AC conversion method is referred to as pulse width modulation (PWM) method. Embodiments disclosed in this application involve driving techniques based on the PWM method.

Because in each phase, the upper and lower switches cannot be turned on at the same time (or else unwanted noise events may occur), there are eight different switching states that are available for inverter 140. For example, one switching state is when $S_1$, $S_4$, and $S_6$ are turned on and $S_2$, $S_3$, and $S_5$ are turned off. The switching status of inverter 140 can be represented by the turning on/off states of all upper switches (or similarly by all lower switches) as a three-element vector (corresponding to the three phases) consisting of "1"s and "0"s. A "1" in the vector represents that the upper switch of a corresponding phase is turned on and a "0" in the vector represents that the upper switch of a corresponding phase is turned off. These vectors may also be referred to as space vectors, voltage vectors, or switching vectors. The eight space vectors can be defined as follows:

$V_1:(S_1,S_3,S_5)=(1,0,0);$ $V_2:(S_1,S_3,S_5)=(1,1,0);$ $V_3:(S_1,S_3,S_5)=(0,1,0);$ $V_4:(S_1,S_3,S_5)=(0,1,1);$ $V_5:(S_1,S_3,S_5)=(0,0,1);$ $V_6:(S_1,S_3,S_5)=(1,0,1)$;

$V_7:(S_1,S_3,S_5)=(1,1,1)$;

$V_0:(S_1,S_3,S_5)=(0,0,0)$.

Figure 2:
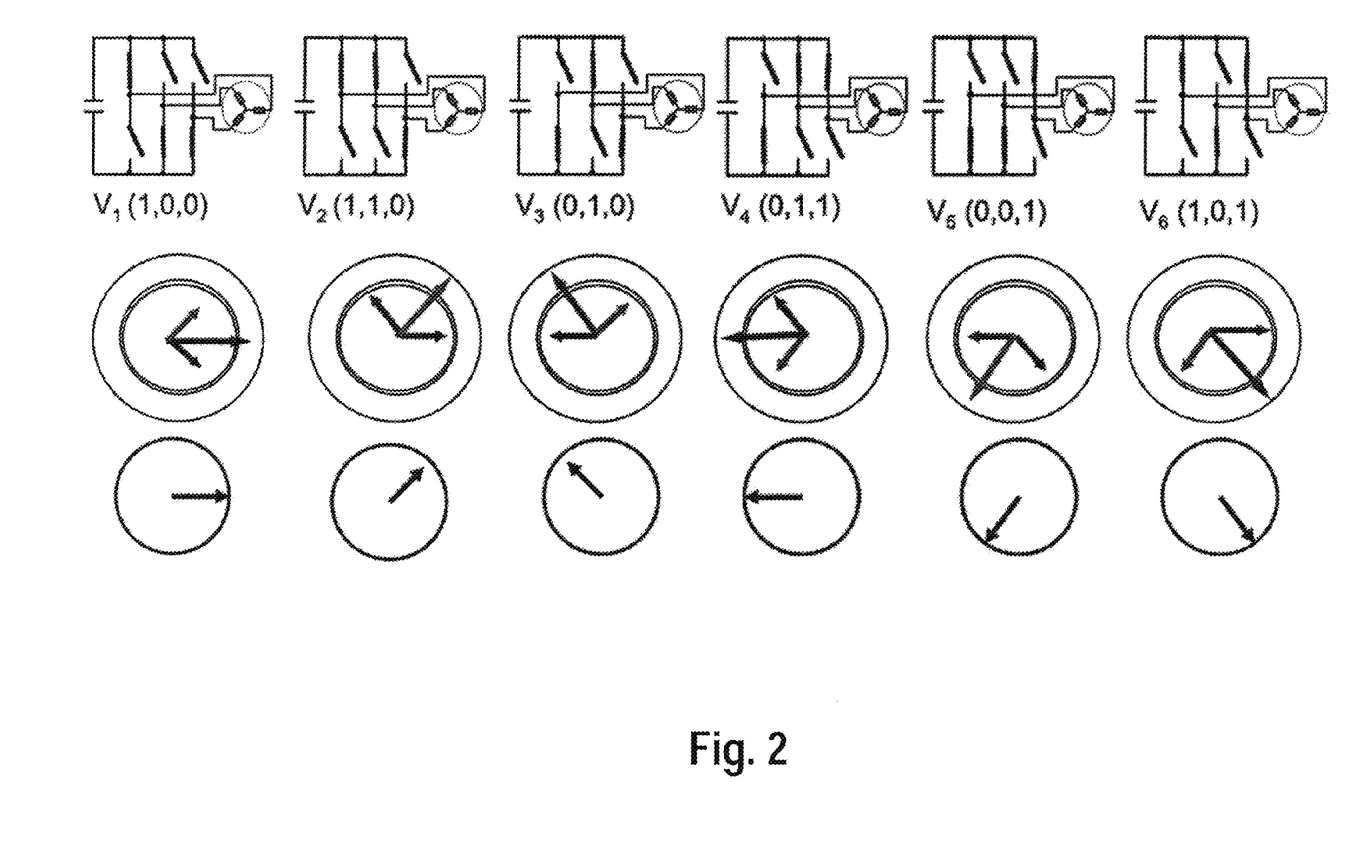
FIG. 2 illustrates exemplary space vectors, according to some disclosed embodiments.

FIG. 2 shows the directions of flux (or current) vectors (middle row) that correspond to the switching states of $V_1$-$V_6$ (upper row). The upper row shows the switching status represented by the turning on/off states of the switches. The direction of a space vector (lower row) can be chosen to be identical to that of the resulting flux (or current) vector. For example, the direction of $V_1=(1, 0, 0)$ can be defined to be the same as that of the flux (or current) vector that resulted from the switching state: $(S_1, S_3, S_5)=(1, 0, 0)$. The directions of other space vectors can be similarly defined, as shown in the lower row of FIG. 2.

Figure 3:
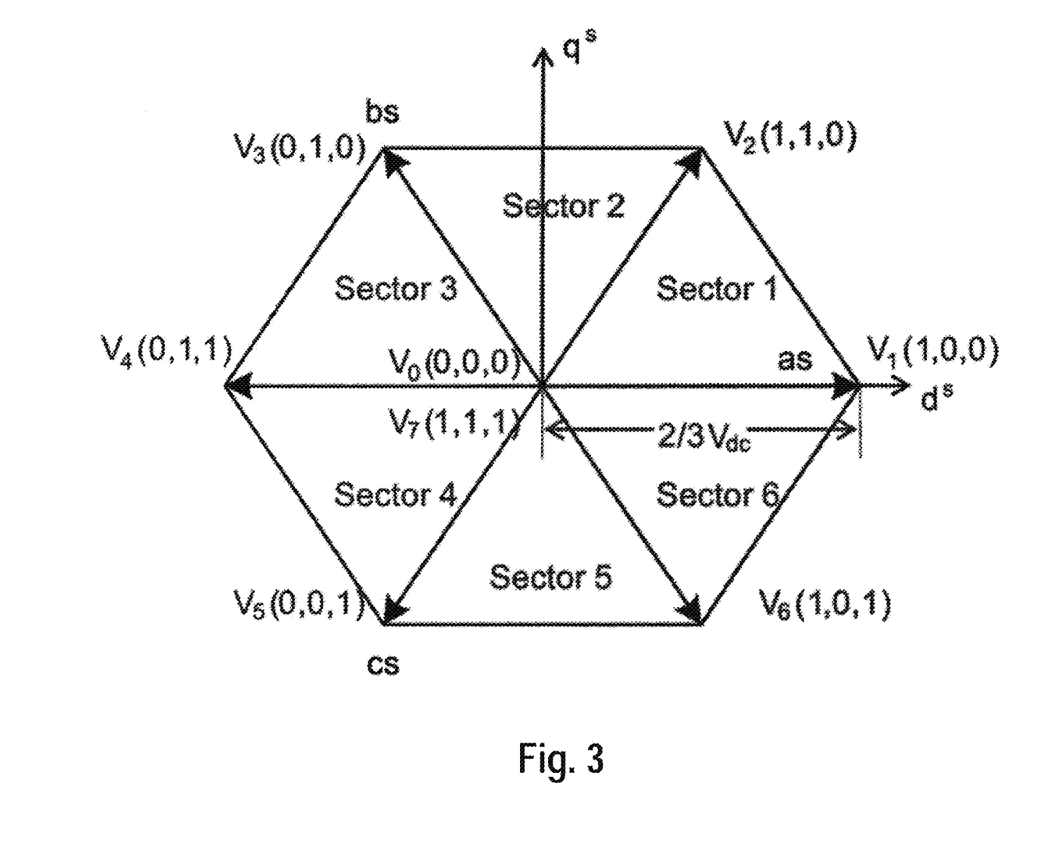
FIG. 3 shows a space vector hexagon, according to some disclosed embodiments.
Figure 4:
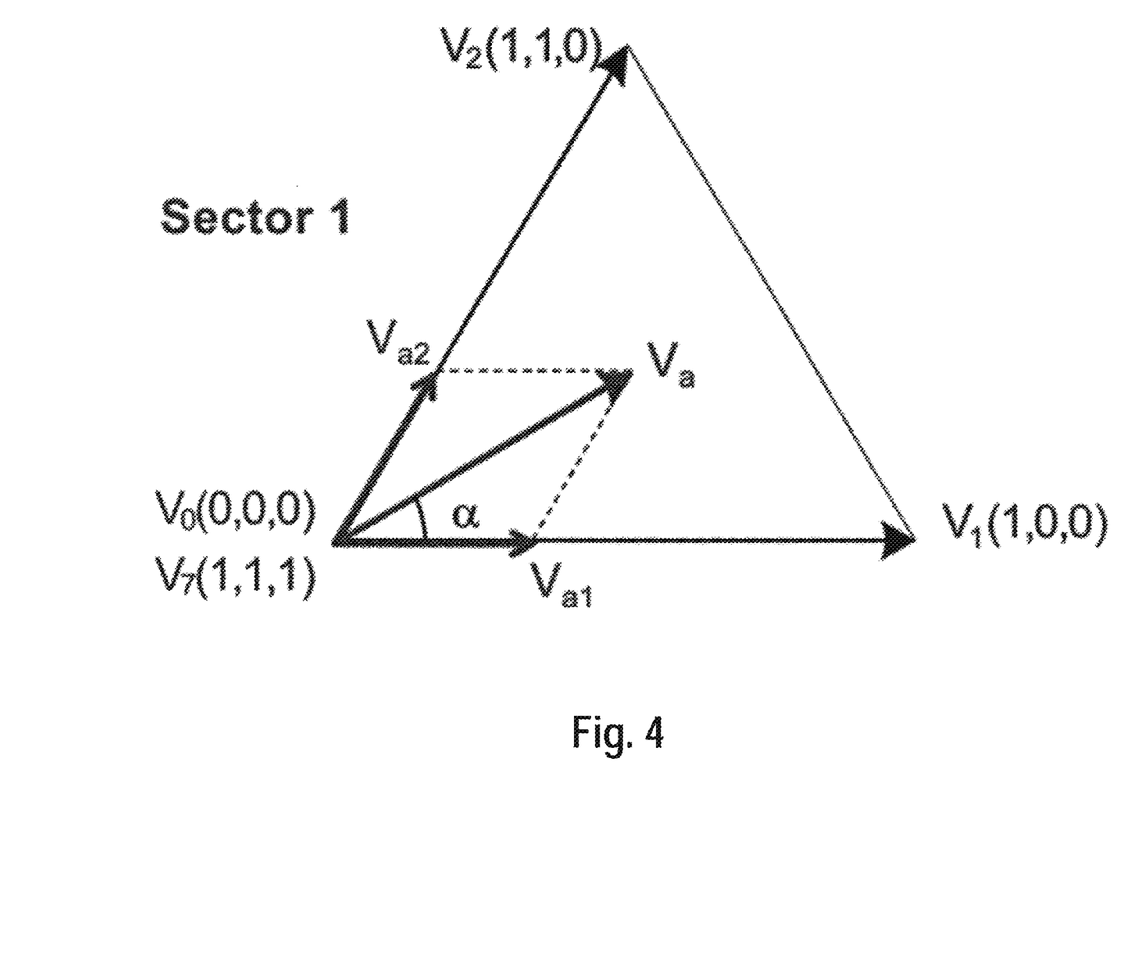
FIG. 4 shows decomposition of a voltage vector, according to some disclosed embodiments.

FIG. 3 shows a hexagon that contains all eight space vectors. As shown in FIG. 3, the hexagon is divided by space vectors $V_1$-$V_6$ into six sectors (Sector 1 to Sector 6). $V_0$ and $V_7$ are zero vectors that "shrink" as a point located at the origin. $V_0$ and $V_7$ have zero length. The length of each remaining space vector is $\frac{2}{3}V_{dc}$. Using the hexagon and the space vectors shown in FIG. 3, an arbitrary space vector can be represented as a sum of decomposed vectors. For example, FIG. 4 shows an arbitrary space vector $V_a$ in Sector 1. $V_a$ can be represented as $V_a=V_{a1}+V_{a2}$, where $V_{a1}$ and $V_{a2}$ are the decomposed vectors along the directions of $V_1$ an $V_2$, respectively. In other words, $V_a$ can be synthesized by $V_1$ and $V_2$ through turning on $V_1$ and $V_2$ for time intervals proportional to $V_{a1}$ and $V_{a2}$, respectively. The "off" state can be represented using $V_0$.

In general, a voltage vector $\vec{V}$ can be represented as follows:

$$\vec{V}=a\cdot\vec{V}_\alpha+b\cdot\vec{V}_\beta+z\cdot\vec{V}_0 \quad (1)$$

$$a+b+z=1 \quad (2)$$

$\vec{V}_\alpha$ and $\vec{V}_\beta$ are the two space vectors selected from $V_1$-$V_6$ that define the sector in which $\vec{V}$ is located, a, b, and z are decomposition coefficients.

As discussed above, avoiding simultaneous or nearly simultaneous switching of two or more switches may suppress switching interference and prevent shoot-through events or unwanted noise events. One way to avoid simultaneous or nearly simultaneous switching is to set a minimal time interval between any two switching events, and to guarantee the minimal time interval. If two switching events are closer than the minimal time interval, then one of them can be shifted to another timing to ensure the minimal time interval. This minimal time interval, also referred to as a dead zone, can be represented in time domain as a time period in which no switching event is allowed. On the space vector hexagon shown in FIG. 3, a dead zone can be represented as a ribbon or a bar marking an area in which no voltage vector should be allowed. In other words, if a voltage vector falls within the dead zone, the voltage vector should be moved out of the dead zone.

A dead zone can be defined using decomposition coefficients a, b, and z. For example, the dead zone(s) can be defined as:

$$k_{a\_lo}<a<k_{a\_hi}, \quad (3)$$

$$k_{b\_lo}<b<k_{b\_hi}, \quad (4)$$

$$k_{z\_lo}<z<k_{z\_hi}. \quad (5)$$

$k_{a\_lo}$ and $k_{a\_hi}$ are the lower and higher limits of the dead zone with respect to coefficient a. Similarly, $k_{b\_lo}$ and $k_{b\_hi}$ are lower and higher limits of the dead zone with respect to coefficient b; $k_{z\_lo}$ and $k_{z\_hi}$ are lower and higher limits of the dead zone with respect to coefficient z.

Figure 5:
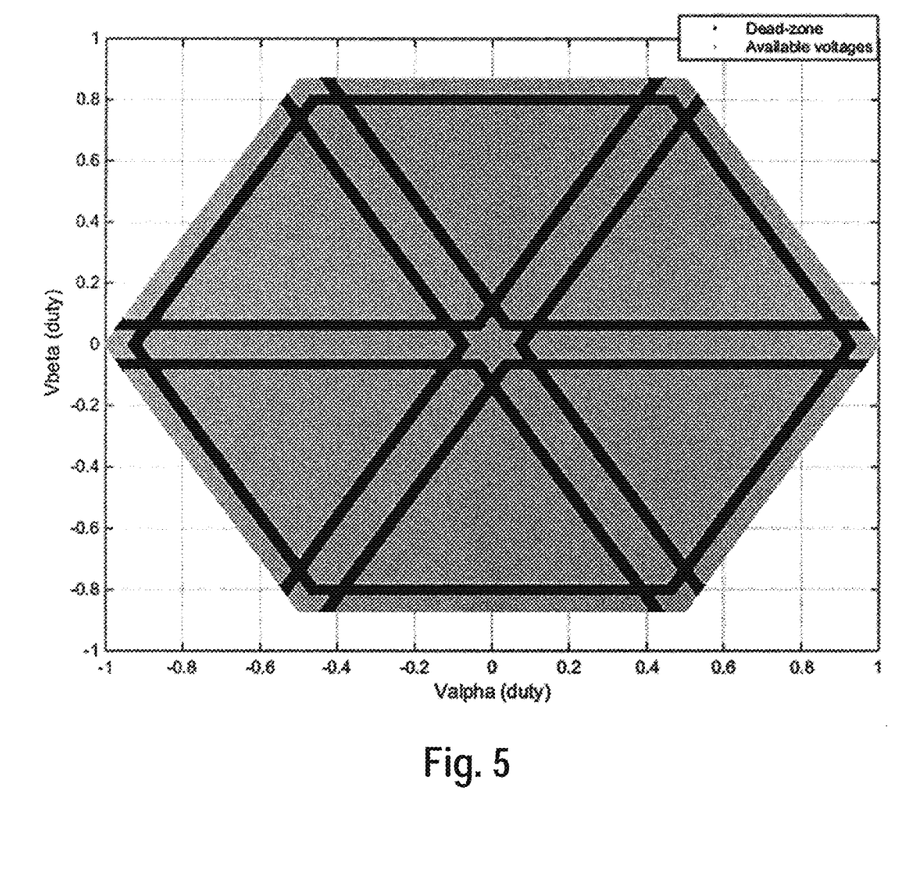
FIG. 5 shows dead zones marked on a space vector hexagon, according to some disclosed embodiments.

FIG. 5 is a space vector hexagon showing the dead zones and available voltage vectors (i.e., all other voltage vectors that are not in any dead zone). As shown in FIG. 5, the dead zones are marked by darker ribbons, including several ribbons crossing the hexagon and several ribbons close to the boundary of the hexagon. The dead zones shown in FIG. 5 are defined by setting the lower limits of all three coefficients equal to 0.025 and the higher limit of all three coefficients equal to 0.05. Other suitable values can also be used to set the lower/higher limits.

Figure 6A:
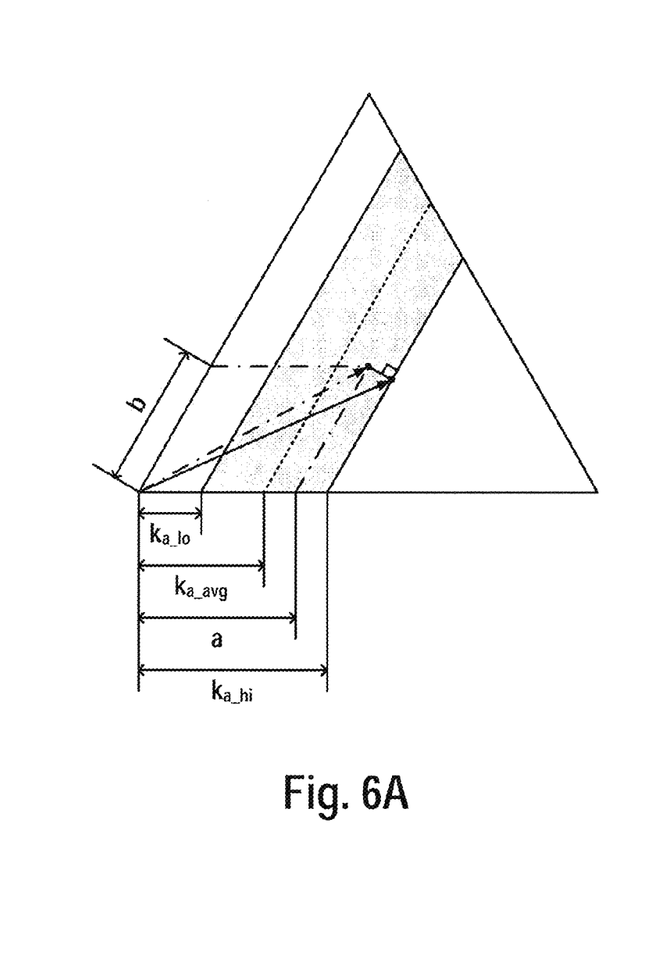
FIGS. 6A and 6B show exemplary methods of modifying a voltage vector falling within a dead zone, according to some disclosed embodiments.
Figure 6B:
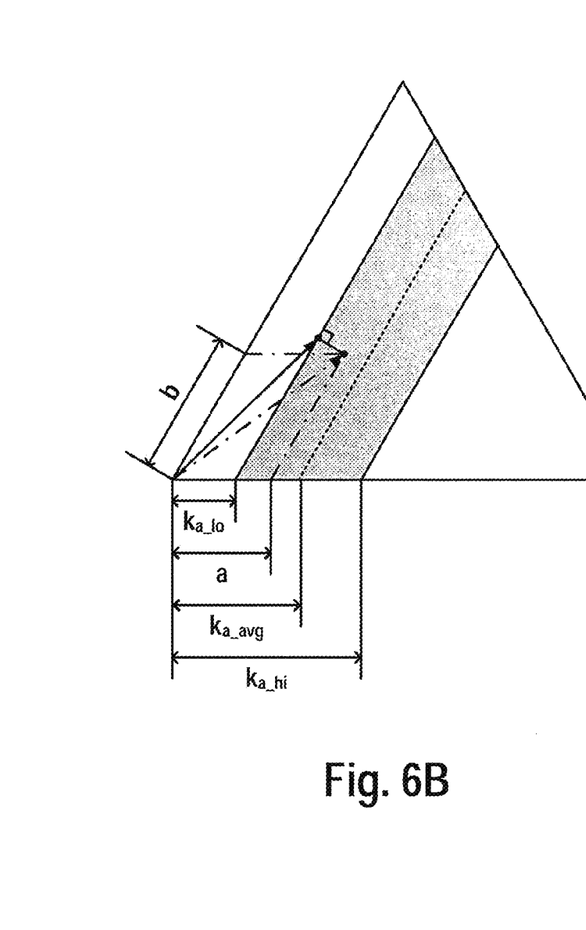
Figure 9:
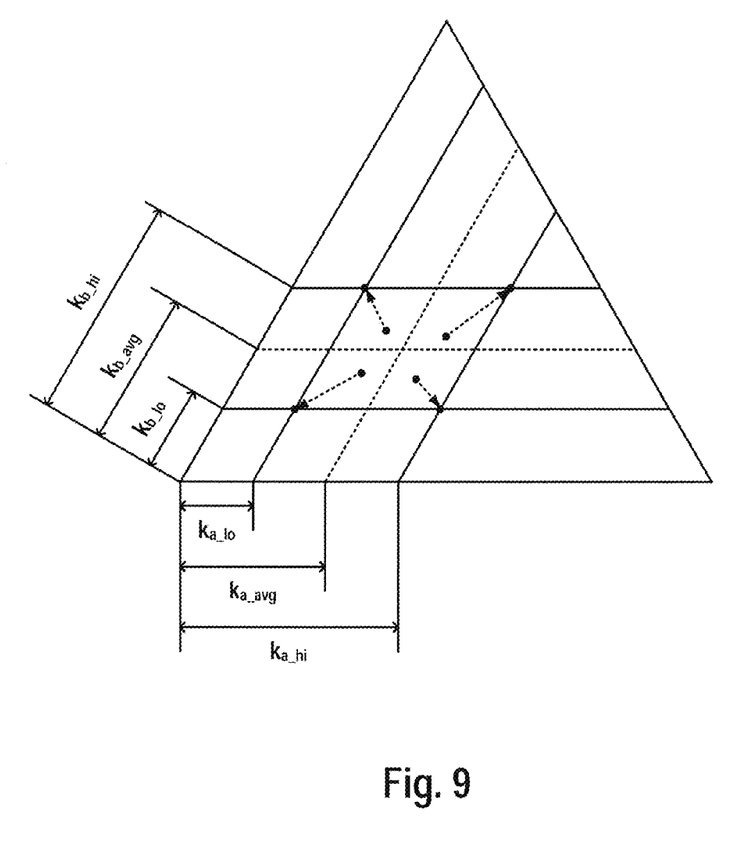
FIG. 9 shows a first exemplary method of modifying a voltage vector failing within an overlapping area of two dead zones, according to some disclosed embodiments.
Figure 10:
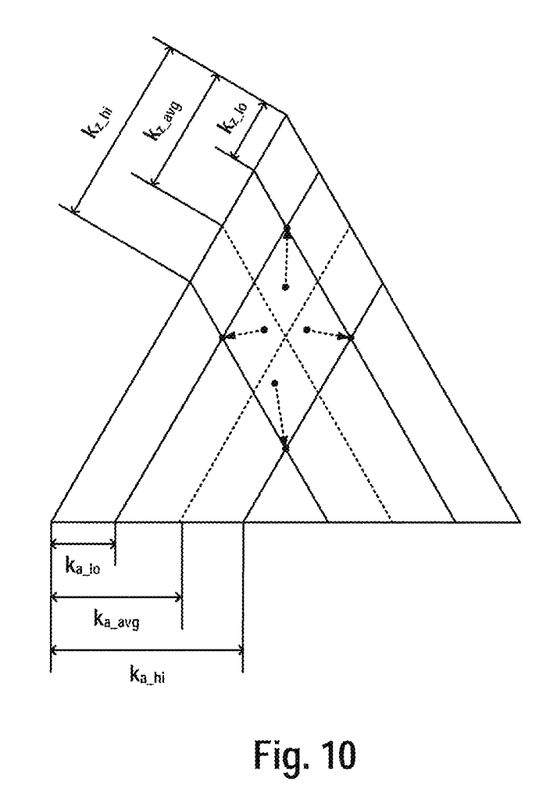
FIG. 10 shows a second exemplary method of modifying a voltage vector failing within an overlapping area of two dead zones, according to some disclosed embodiments.
Figure 11:
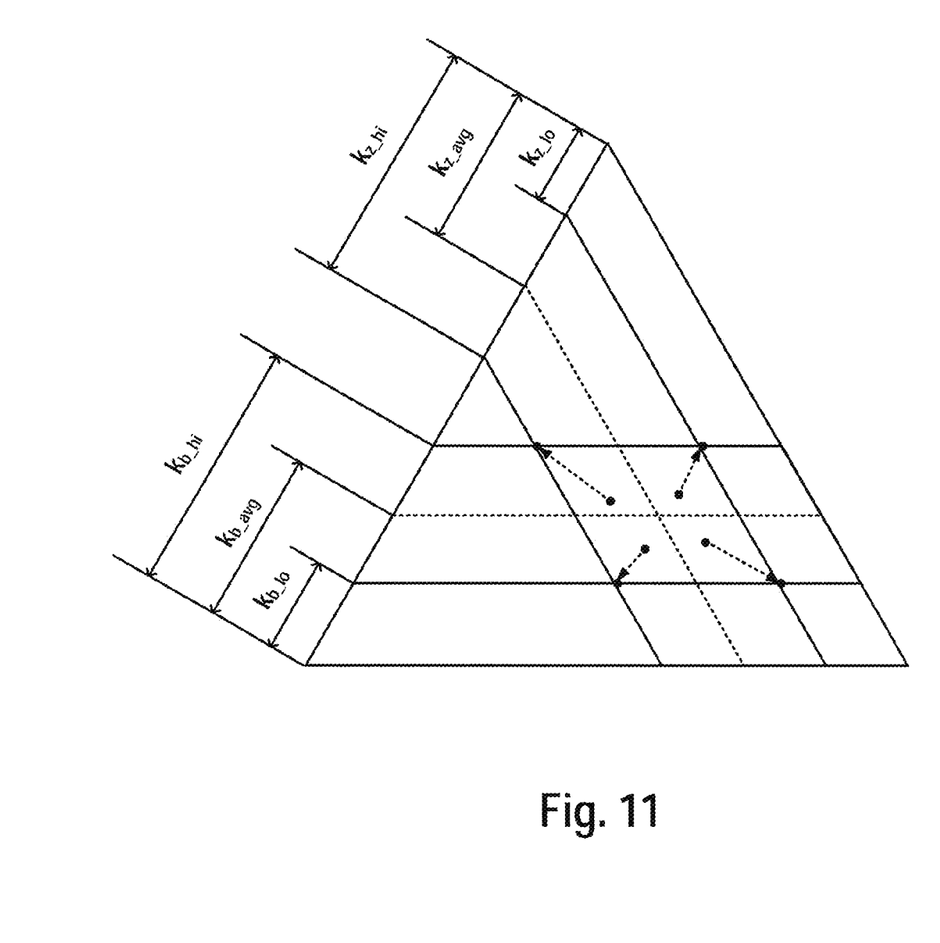
FIG. 11 shows a third exemplary method of modifying a voltage vector failing within an overlapping area of two dead zones, according to some disclosed embodiments.

FIGS. 6A and 6B show exemplary processes of moving a voltage vector out of a dead zone. While many methods can be used to modify a voltage vector to move it out of a dead zone, the modified voltage vector may cause phase voltage/current distortion because of the difference between the modified voltage vector and the original voltage vector. For example, unexpected current ripples may appear in phase current. To minimize the distortion, embodiments of the present application use the nearest or closest available voltage vector outside the dead zone to replace the original voltage vector. Specifically, embodiments of the present application may project the original voltage vector to the boundary of a dead zone when the original voltage vector falls within a single dead zone. FIGS. 6A, 6B, 7A, 7B, 8A, and 8B show various such examples. If the original voltage vector falls within an overlapping area of two dead zones, then the original voltage vector may be moved to the closest intersection of two boundaries of the two dead zones. FIGS. 9-11 show various such examples.

Referring to FIG. 6A, the dead zone is between $k_{a\_lo}$ and $k_{a\_hi}$. Assuming FIG. 6A shows Sector 1, the dead zone is parallel to $V_2$. The dead zone can be divided into two parts by a center line located at $k_{a\_avg}$. For any coefficient a, b, and z, the center line or average line is defined by $k_{avg}=0.5\cdot(k_{hi}+k_{lo})$. The divided dead zone includes a higher half (from $k_{a\_avg}$ to $k_{a\_hi}$) and a lower half (from $k_{a\_lo}$ to $k_{a\_avg}$). FIG. 6A shows an example where a voltage vector falls within the higher half ($k_{a\_avg}\leq a<k_{a\_hi}$), while FIG. 6B shows an example where a voltage vector falls within the lower half ($k_{a\_lo}<a<k_{a\_avg}$).

FIG. 6A shows a voltage vector $\vec{V}=a\cdot\vec{V}_\alpha+b\cdot\vec{V}_\beta+z\cdot\vec{V}_0$. This voltage vector may be one that is designed to be implemented by inverter 140 to achieve certain operation goal. For clarity, this voltage vector is referred to as an original voltage vector or original vector. Because the original vector falls within the dead zone, and more specifically the higher half of the dead zone, it needs to be modified to suppress switching interference. The modification algorithm is as follows:

$$a'=k_{a\_hi}$$

$$b'=b-0.5\cdot(k_{a\_hi}-a)$$

$$z'=1-a'-b'=z-0.5\cdot(k_{a\_hi}-a)$$

The modified vector is $\vec{V}'=a'\cdot\vec{V}+b'\cdot\vec{V}_\beta+z'\cdot\vec{V}_0$. Geometrically, the modification includes projecting the original vector $\vec{V}$ the closest boundary of the dead zone (in this case the boundary at $k_{a\_hi}$). The projection may be a 90-degree projection such that the line connecting the original vector $\vec{V}$ and the modified vector $\vec{V}'$ is perpendicular to the boundary. The modified vector $\vec{V}'$ may then be used as a replacement of the original vector in the switching operation. Because for the original vector $\vec{V}$, $\vec{V}'$ is the closest available vector outside the dead zone, $\vec{V}'$ can minimize voltage/current distortion.

Figure 7A:
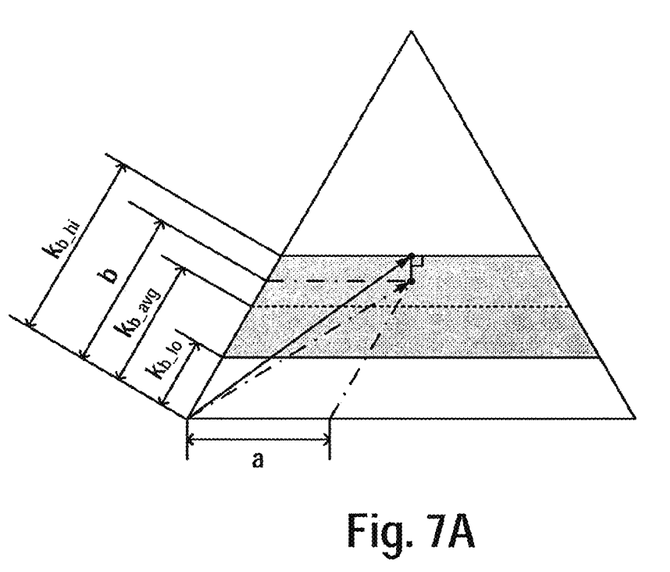
FIGS. 7A and 7B show exemplary methods of modifying a voltage vector falling within a dead zone, according to some disclosed embodiments.
Figure 7B:
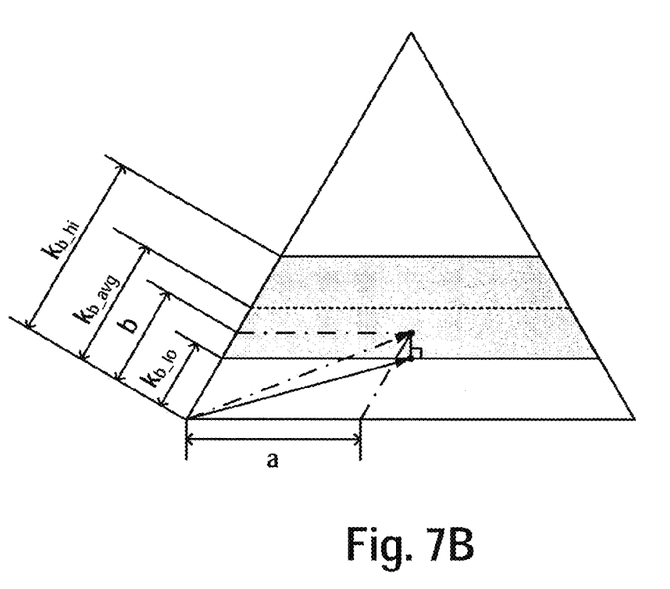
Figure 8A:
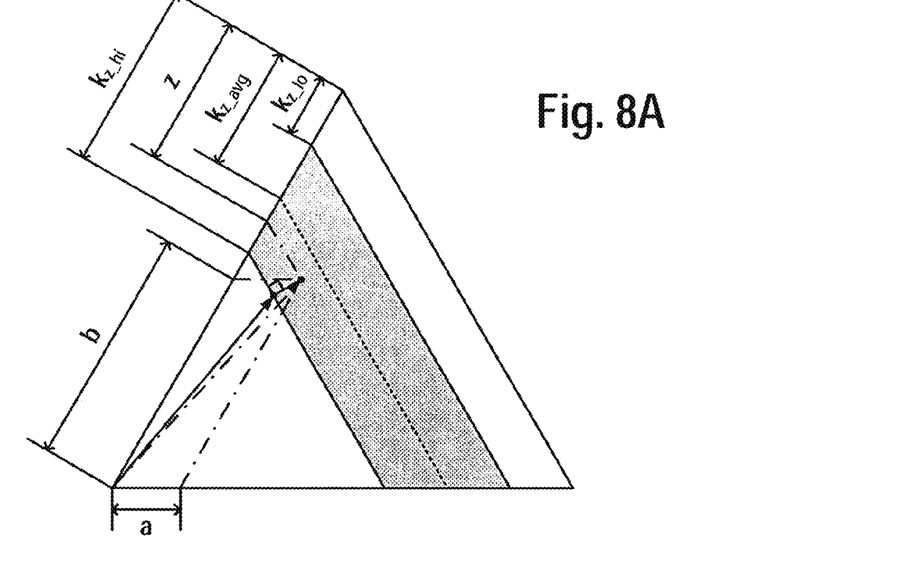
FIGS. 8A and 8B show exemplary methods of modifying a voltage vector falling within a dead zone, according to some disclosed embodiments.
Figure 8B:
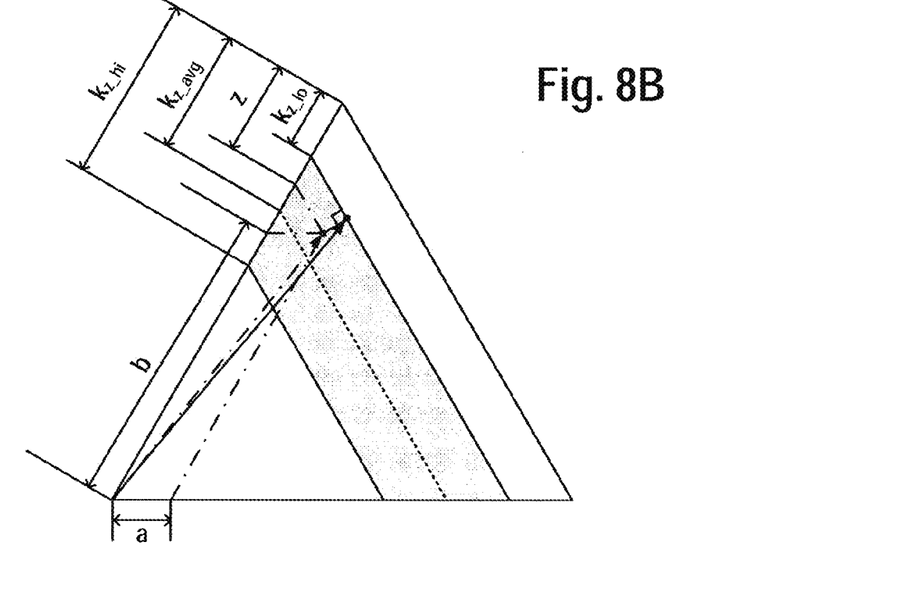

FIG. 6B shows an example where an original vector falls within the lower half of the dead zone. Similar to the example shown in FIG. 6A, the modified vector can be obtained by projecting the original vector to the closest boundary, in this case the boundary at $k_{a\_lo}$. The algorithm is as follows:

$a'=k_{a\_lo}$ $b'=b+0.5\cdot(a-k_{a\_lo})$ $z'=1-a'-b'=z+0.5\cdot(a-k_{a\_lo})$ FIGS. 7A and 7B show examples of modifying voltage vectors falling within the dead zone defined by $k_{b\_lo}$ and $k_{b\_hi}$. FIG. 7A shows an example where an original voltage vector falls within the higher half of the dead zone ($k_{b\_avg} \leq b \leq k_{b\_hi}$). Similar to the example shown in FIG. 6A, the modified vector may be obtained by projecting the original vector to the closest boundary of the dead zone, in this case the boundary at $k_{b\_hi}$. The algorithm is as follows:

$a'=a-0.5\cdot(k_{b\_hi}-b)$ $b'=k_{b\_hi}$ $z'=1-a'-b'=z-0.5\cdot(k_{b\_hi}-b)$ FIG. 7B shows an example where an original vector falls within the lower half of the dead zone ($k_{b\_lo}<b<k_{b\_avg}$). Again, the modified vector may be found by projecting the original vector to the closest boundary of the dead zone, in this case the boundary at $k_{b\_lo}$. The algorithm is as follows:

$a'=a+0.5\cdot(b-k_{b\_lo})$ $b'=k_{b\_lo}$ $z'=1-a'-b'=z+0.5\cdot(b-k_{b\_lo})$ FIGS. 8A and 8B show examples of modifying voltage vectors falling within the dead zone defined by $k_{z\_lo}$ and $k_{z\_hi}$. FIG. 8A shows an example where an original voltage vector falls within the higher half of the dead zone ($k_{z\_avg} \leq z < k_{z\_hi}$). Similar to the example shown in FIG. 6A, the modified vector may be obtained by projecting the original vector to the closest boundary of the dead zone, in this case the boundary at $k_{z\_hi}$. The algorithm is as follows:

$a'=a-0.5\cdot(k_{z\_hi}-z)$ $b'=b-0.5\cdot(k_{z\_hi}-z)$ $z'=k_{z\_hi}$

FIG. 8B shows an example where an original vector falls within the lower half of the dead zone ($k_{z\_lo}<z<k_{z\_avg}$). Again, the modified vector may be found by projecting the original vector to the closest boundary of the dead zone, in this case the boundary at $k_{z\_lo}$. The algorithm is as follows:

$a'=a+0.5\cdot(z-k_{z\_lo})$ $b'=b+0.5\cdot(z-k_{z\_lo})$ $z'=k_{z\_lo}$

FIG. 9 shows an example where an original vector falls within an overlapping area of two dead zones, in this case the dead zones defined by ($k_{a\_lo}$, $k_{a\_hi}$) and ($k_{b\_lo}$, $k_{b\_hi}$). In this case, the modified vector may be found by moving the original vector to a closest intersection between a first boundary of the first dead zone and a second boundary of the second dead zone. For example, as shown in FIG. 9, the overlapping area may be divided into four parts by the center lines of the two dead zones: $k_{a\_avg}=0.5\cdot(k_{a\_lo}+k_{a\_hi})$ and $k_{b\_avg}=0.5\cdot(k_{b\_lo}+k_{b\_hi})$. Each part has a respective closest intersection point. When the original vector falls within one of the four parts of the overlapping area, the original vector may be modified by projecting or moving the original vector to the closest intersection point corresponding to that part, as indicated by the arrows in FIG. 9. The algorithm is as follows:

$a'=k_{a\_lo}$ or $k_{a\_hi}$ (closest)

$b'=k_{b\_lo}$ or $k_{b\_hi}$ (closest)

$z'=1-a'-b'$

FIG. 10 shows an example where an original vector falls within an overlapping area of two dead zones defined by ($k_{a\_lo}$, $k_{a\_hi}$) and ($k_{z\_lo}$, $k_{z\_hi}$). Similar to the example shown in FIG. 9, the modified vector may be obtained by projecting or moving the original vector to the closest intersection between boundaries of the two dead zones, as indicated by the arrows in FIG. 10. The algorithm is as follows:

$a'=k_{a\_lo}$ or $k_{a\_hi}$ (closest)

$z'=k_{z\_lo}$ or $k_{z\_hi}$ (closest)

$b'=1-a'-z'$

FIG. 11 shows an example where an original vector falls within an overlapping area of two dead zones defined by ($k_{b\_lo}$, $k_{b\_hi}$) and ($k_{z\_lo}$, $k_{z\_hi}$). Similar to the example shown in FIG. 9, the modified vector may be obtained by projecting or moving the original vector to the closest intersection between boundaries of the two dead zones, as indicated by the arrows in FIG. 11. The algorithm is as follows:

$b'=k_{b\_lo}$ or $k_{b\_hi}$ (closest)

$z'=k_{z\_lo}$ or $k_{z\_hi}$ (closest)

$a'=1-b'-z'$

Figure 12:
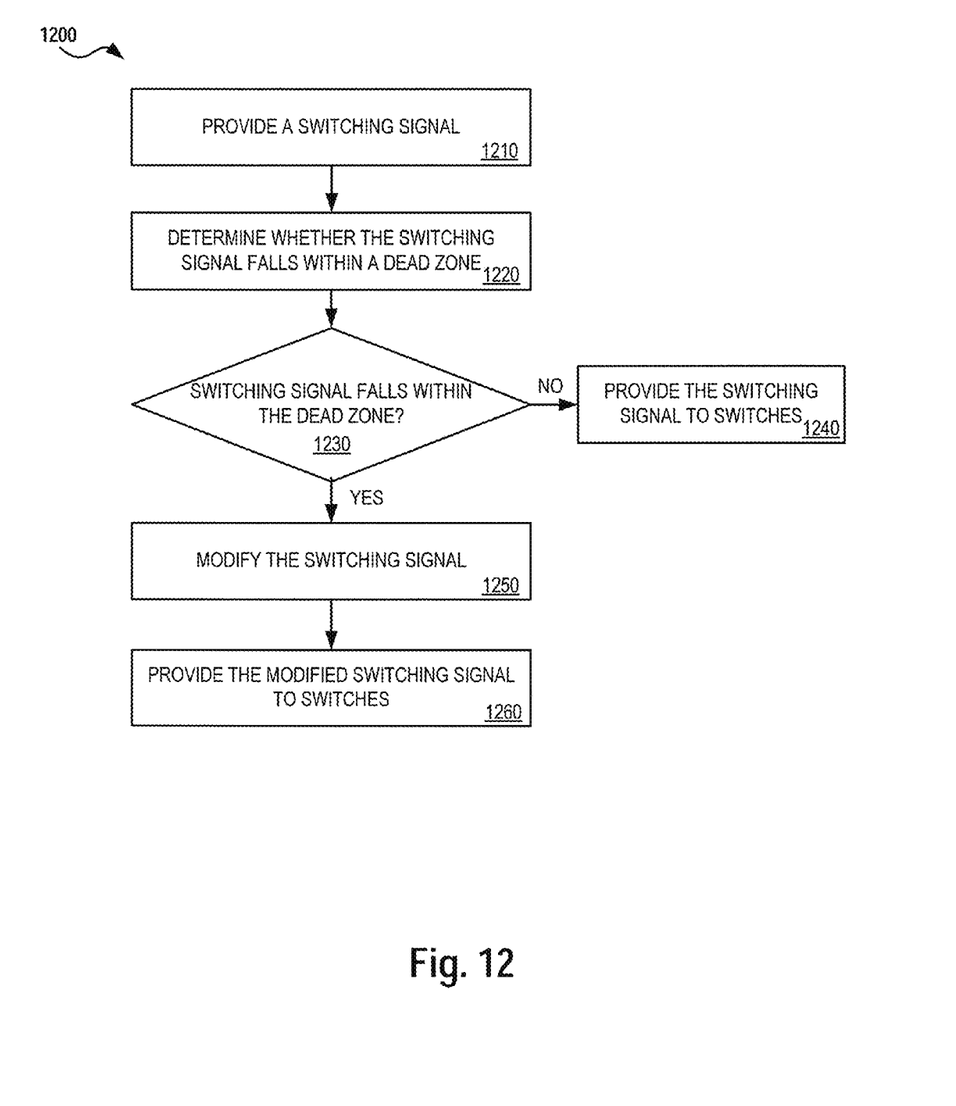
FIG. 12 is a flow chart of an exemplary method for suppressing switching interference, according to some disclosed embodiments.

FIG. 12 is a flow chart showing steps of an exemplary method 1200 for suppressing switching interference, according to various embodiments. Method 1200 may be implemented by controller 130 or a driver IC. Method 1200 include a plurality of steps, some of which may be optional.

In step 1210, controller 130 may provide a switching signal for controlling switching operations of a plurality of switches (e.g., $S_1$-$S_6$). For example, the switching signal may be provided by controller 130 based on a look up table, a formula, an algorithm, or other suitable means.

In step 1220, controller 130 may determine whether the switching signal falls within a predetermined dead zone. For example, controller 130 may determine whether a decomposition coefficient (e.g., a, b, or z) of the space vector corresponding to the switching signal is between the higher and lower limits of the dead zone (e.g., $k_{a\_lo}$ and $k_{a\_hi}$ for coefficient a). If so, then controller 130 may determine that the switching signal falls within the dead zone.

In step 1230, if controller 130 determines that the switching signal falls within the dead zone, method 1200 proceeds to step 1250. Otherwise, method 1200 proceeds to step 1240, in which controller 130 provides the switching signal to the switches.

In step 1250, controller 130 may modify the switching signal to move it out of the dead zone. For example, controller 130 may move the space vector corresponding to the switching signal to a closest boundary of the dead zone (e.g., FIGS. 6A, 6B, 7A, 7B, 8A, and 8B). Controller 130 may project (e.g., 90-degree projection) the space vector corresponding to the switching signal to the closest boundary to find the modified switching signal, which is the closest available switching signal outside the dead zone. When the switching signal falls within an overlapping area of two dead zones, the modified switching signal may be found by moving the space vector corresponding to the switching signal to a closest intersection between two boundaries of the two overlapping dead zones (e.g., FIGS. 9-11).

In step 1260, controller 130 may provide the modified switching signal to the switches to minimize voltage/current distortion.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments.

It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A driving circuit for driving a load, comprising:
a plurality of switching devices; and
a controller electrically connected to the plurality of switching devices, wherein the controller is configured to:
provide a switching signal for controlling switching operations of the switching devices;
determine whether the switching signal falls within a predetermined dead zone, the predetermined dead zone having a lower limit and a higher limit;
when it is determined that the switching signal falls within the predetermined dead zone, modify the switching signal by moving a space vector corresponding to the switching signal to a boundary of the predetermined dead zone; and
provide the modified switching signal to the switching devices;
wherein the controller is configured to determine whether the switching signal falls within the predetermined dead zone by:
determining whether a decomposition coefficient of the space vector corresponding to the switching signal is between the lower and higher limits, the decomposition coefficient corresponding to a proportion of the space vector decomposed along a boundary of a sector in which the space vector is located, wherein the sector is defined by two adjacent switching vectors corresponding to two different switching states of the plurality of switching devices; and
determining that the switching signal falls within the predetermined dead zone when it is determined that the decomposition coefficient of the space vector corresponding to the switching signal is between the lower and higher limits.

2. The driving circuit of claim 1, wherein the controller is configured to:
replace the decomposition coefficient with one of the higher or the lower limit that is closer to the decomposition coefficient.

3. The driving circuit of claim 1, wherein the controller is configured to:
modify the switching signal by projecting the space vector corresponding to the switching signal to a closest boundary of the predetermined dead zone, wherein a line connecting the space vector corresponding to the switching signal and a space vector corresponding to the modified switching signal is perpendicular to the closest boundary.

4. The driving circuit of claim 1, wherein the controller is configured to:
determine whether the switching signal falls within an overlapping area of first and second predetermined dead zones; and
when it is determined that the switching signal falls within the overlapping area of the first and second dead zones, modify the switching signal by moving the space vector corresponding to the switching signal to an intersection between a first boundary of the first dead zone and a second boundary of the second dead zone.

5. The driving circuit of claim 1, wherein the predetermined dead zone indicates a time interval in which no switching event is allowed.

6. The driving circuit of claim 1, wherein the plurality of switching devices include insulated gate bipolar transistors (IGBTs).

7. A method for driving a load, comprising:
providing a switching signal for controlling switching operations of a plurality of switching devices;
determining whether the switching signal falls within a predetermined dead zone, the predetermined dead zone having a lower limit and a higher limit;
when it is determined that the switching signal falls within the predetermined dead zone, modifying the switching signal by moving a space vector corresponding to the switching signal to a boundary of the predetermined dead zone; and
providing the modified switching signal to the switching devices;
wherein determining whether the switching signal falls within the predetermined dead zone includes:
determining whether a decomposition coefficient of the space vector corresponding to the switching signal is between the lower and higher limits, the decomposition coefficient corresponding to a proportion of the space vector decomposed along a boundary of a sector in which the space vector is located, wherein the sector is defined by two adjacent switching vectors corresponding to two different switching states of the plurality of switching devices; and
determining that the switching signal falls within the predetermined dead zone when it is determined that the decomposition coefficient of the space vector corresponding to the switching signal is between the lower and higher limits.

8. The method of claim 7, comprising:
replacing the decomposition coefficient with one of the higher or the lower limit that is closer to the decomposition coefficient.

9. The method of claim 7, comprising:
modifying the switching signal by projecting the space vector corresponding to the switching signal to a closest boundary of the predetermined dead zone, wherein a line connecting the space vector corresponding to the switching signal and a space vector corresponding to the modified switching signal is perpendicular to the closest boundary.

10. The method of claim 7, comprising:
determining whether the switching signal falls within an overlapping area of first and second predetermined dead zones; and
when it is determined that the switching signal falls within the overlapping area of the first and second dead zones, modifying the switching signal by moving the space vector corresponding to the switching signal to an intersection between a first boundary of the first dead zone and a second boundary of the second dead zone.

11. The method of claim 7, wherein the predetermined dead zone indicates a time interval in which no switching event is allowed.

12. A driver integrated circuit (IC) for controlling a driving circuit, the driver IC comprising:
a memory storing software instructions for providing a switching signal for controlling switching operations of a plurality of switching devices of the driving circuit; and
a processing device communicatively connected with the memory, wherein the software instructions, when executed by the processing device, cause the processing device to perform operations including:
determining whether the switching signal falls within a predetermined dead zone, the predetermined dead zone having a lower limit and a higher limit;
when it is determined that the switching signal falls within the predetermined dead zone, modifying the switching signal by moving a space vector corresponding to the switching signal to a boundary of the predetermined dead zone; and
providing the modified switching signal to the switching devices;
wherein determining whether the switching signal falls within the predetermined dead zone includes:
determining whether a decomposition coefficient of the space vector corresponding to the switching signal is between the lower and higher limits, the decomposition coefficient corresponding to a proportion of the space vector decomposed along a boundary of a sector in which the space vector is located, wherein the sector is defined by two adjacent switching vectors corresponding to two different switching states of the plurality of switching devices; and
determining that the switching signal falls within the predetermined dead zone when it is determined that the decomposition coefficient of the space vector corresponding to the switching signal is between the lower and higher limits.

13. The driver IC of claim 12, wherein the operations include:
replacing the decomposition coefficient with one of the higher or the lower limit that is closer to the decomposition coefficient.

14. The driver IC of claim 12, wherein the operations include:
modifying the switching signal by projecting the space vector corresponding to the switching signal to a closest boundary of the predetermined dead zone, wherein a line connecting the space vector corresponding to the switching signal and a space vector corresponding to the modified switching signal is perpendicular to the closest boundary.

15. The driver IC of claim 12, wherein the operations include:
determining whether the switching signal falls within an overlapping area of first and second predetermined dead zones; and
when it is determined that the switching signal falls within the overlapping area of the first and second dead zones, modifying the switching signal by moving the space vector corresponding to the switching signal to an intersection between a first boundary of the first dead zone and a second boundary of the second dead zone.

16. The driver IC of claim 12, wherein the predetermined dead zone indicates a time interval in which no switching event is allowed.

17. The driver IC of claim 12, wherein the plurality of switching devices include insulated gate bipolar transistors (IGBTs).

* * * * *